May 17, 1960    E. V. QUISTGAARD ET AL    2,936,653
CHANGE SPEED TRANSMISSION CONTROL
Filed Sept. 10, 1954    3 Sheets-Sheet 1
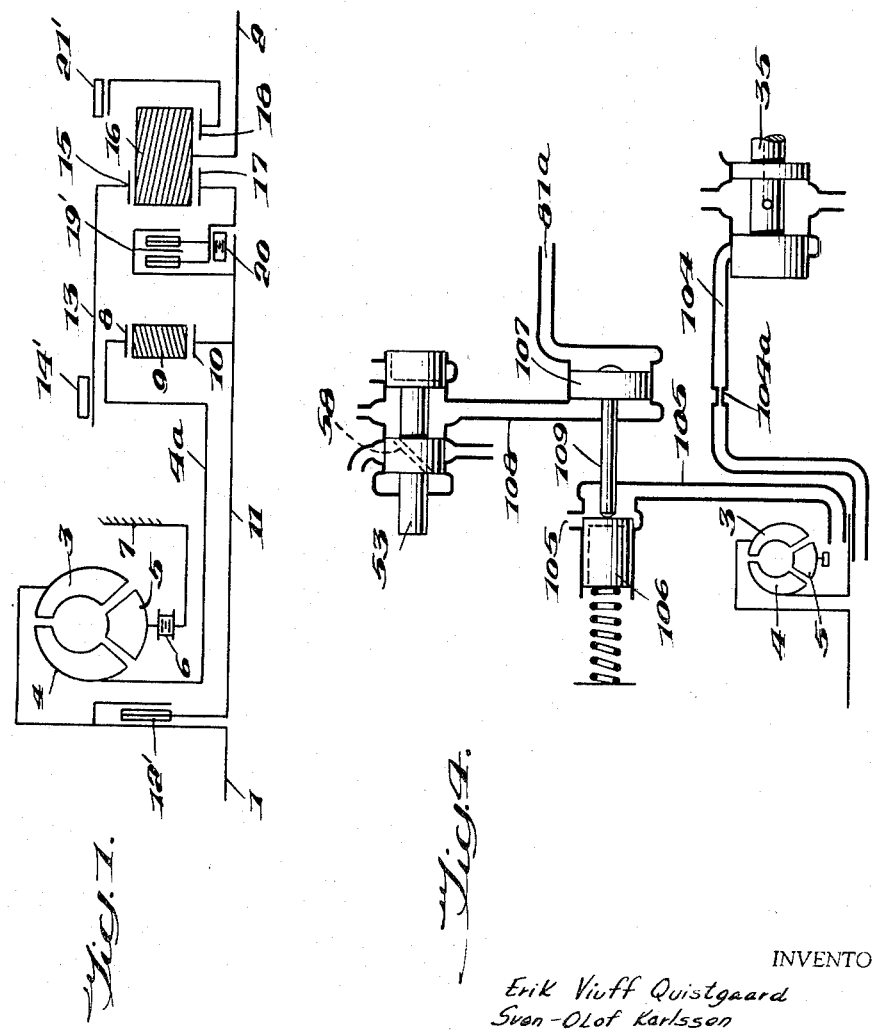
INVENTORS
Erik Viuff Quistgaard
Sven-Olof Karlsson
   now by change of name,
Sven-Olof Kronogard
BY Pierce, Scheffler & Parker
ATTORNEYS

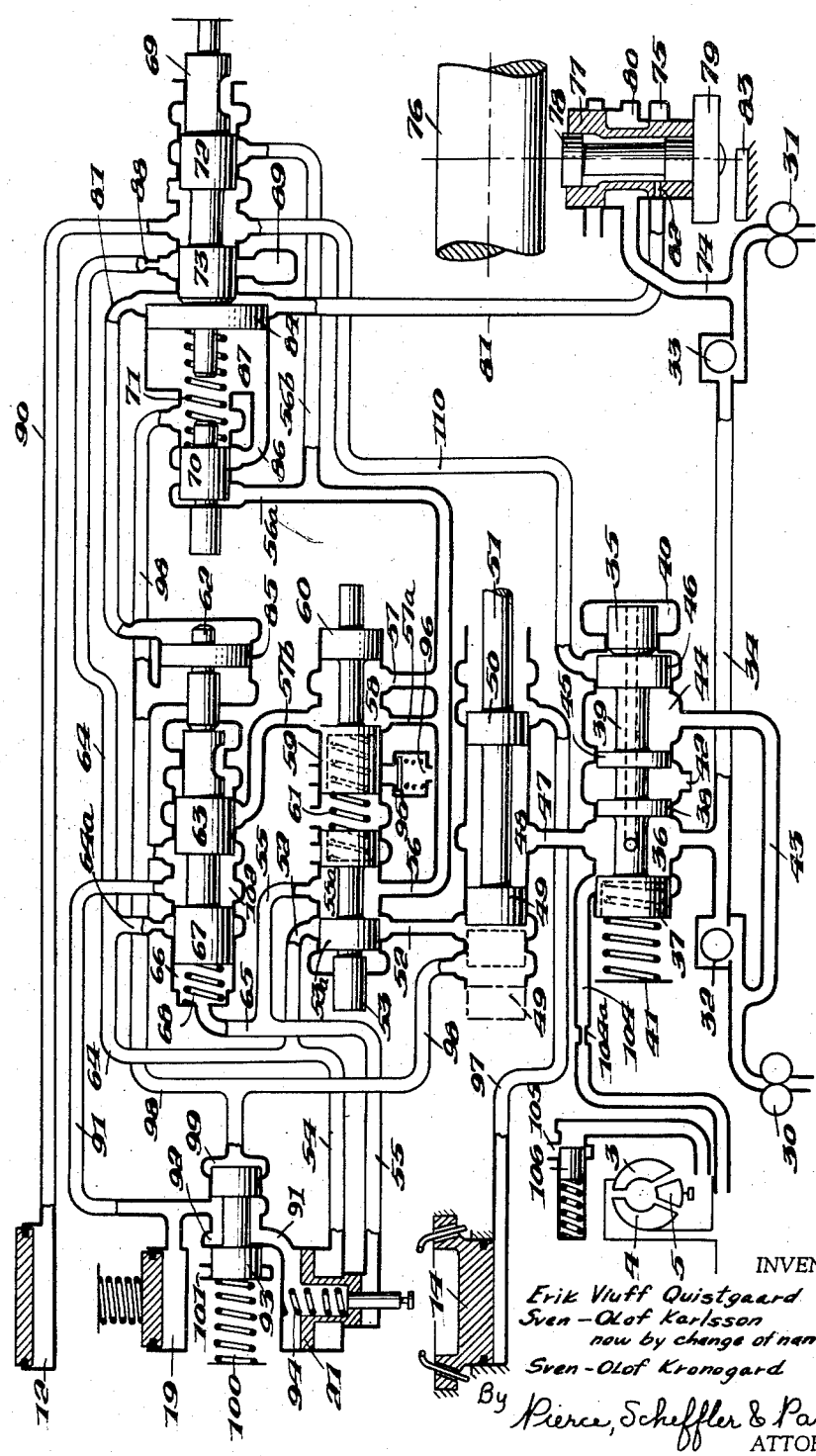

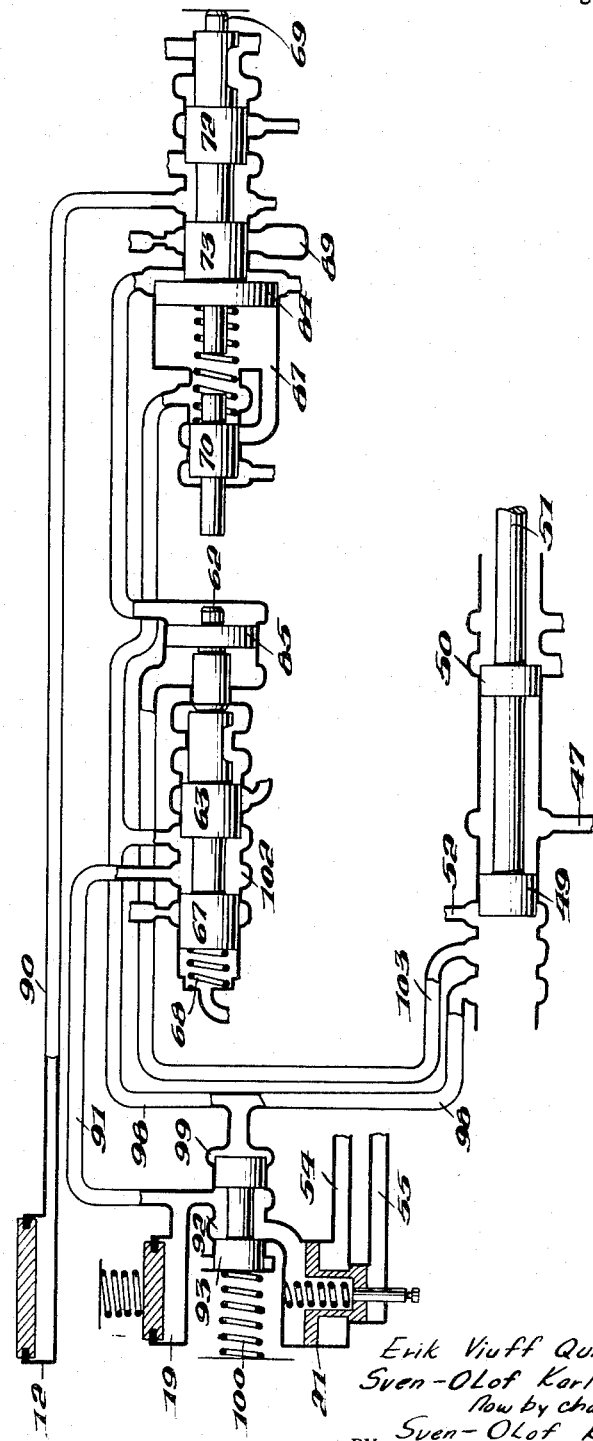

United States Patent Office 2,936,653
Patented May 17, 1960

2,936,653
CHANGE SPEED TRANSMISSION CONTROL

Erik Viuff Quistgaard and Sven-Olof Karlsson, Goteborg, Sweden, now by change of name Sven-Olof Kronogard, assignors to Aktiebolaget Volvo, Goteborg, Sweden, a corporation of Sweden Application September 10, 1954, Serial No. 455,208

Claims priority, application Sweden September 10, 1953

5 Claims. (Cl. 74—645)

The present invention refers to a controlling arrangement for hydraulically operated change speed gearings, preferably for motor vehicles, said gearings comprising a governor driven by the vehicle and a valve mechanism connected to the power control for the controlling of the pressure of the pressurized medium, in a manner such that the change speed gearing will be automatically shifted for varying operative conditions in dependence on the existing operating conditions, besides which a manually adjustable selector slide is incorporated for an optional determination of the function of the controlling arrangement. The arrangement according to the invention is principally distinguished by the feature that two servo-motors contained therein are mutually connected in such manner that one of them will be thrown out of engagement when the other is thrown into engagement, a stop-valve being included in the conduit between said servo-motors and adapted in a certain position of the selector slide to interrupt the connection between the servo-motors, so that the latter may be in engagement at the same time.

The invention will be explained more closely in the following with reference to the accompanying drawings, wherein Fig. 1 is a diagrammatic representation of a change speed gearing intended for a motor vehicle, said gearing being adapted to be controlled by means of a regulating contrivance in accordance with the invention. Fig. 2 shows a connecting diagram of the controlling arrangement in consideration, and Fig. 3 illustrates a modification of the arrangement according to Fig. 2. Fig. 4 is a connecting diagram relative to certain details in an arrangement for the control of the pressure in a hydraulic torque converter contained in the change speed gearing.

Fig. 1 agrees with Fig. 1 of our co-pending patent application Serial No. 455,207 filed September 10, 1954 on the same day. In this figure, the input shaft of the change speed gearing is designated by 1, while the output shaft is denoted by 2. The pump wheel, the turbine and the guide blade rim of the hydraulic torque converter are designated by 3, 4 and 5, respectively. Further, two planetary gearings are incorporated into the arrangement, said gearings being without any interest in this connection. The important control elements for the operation of the change speed gearing are constituted by the clutch 12, the braking contrivance 14′, the clutch 19′, and the braking contrivance 21′, said four members being adapted to be operated with the aid of the regulating device shown in Figs. 2 and 3. In the latter figure, the servo-motors actuating the members have been designated by corresponding reference numerals.

According to the connecting diagram illustrated in Fig. 2, the regulating contrivance comprises in known manner two pumps for the pressurized medium, that is to say, a pump 30 driven by the driving motor of the vehicle, and a pump 31 driven by the rolling vehicle itself. The pumps 30 and 31 are connected to one and the same conduit 34 over non-return valves 32 and 33, respectively, said conduit being in turn connected to a pressure control valve, the piston slide of which is designated by 35. Here, the conduit 34 opens into an intermediate space 36 between two piston portions 37 and 38, from which space leads a passage 39 through the piston slide 35 to a space 40 at one end of the piston slide. The pressure in the space 40 tends to displace the piston slide, but is counteracted by a spring 41. At a sufficiently high pressure in the conduit 34, the slide will be displaced, however, the piston portion 38 then opening a communication between the space 36 and an outlet conduit 42. Hereby the working pressure is determined in the system, when the vehicle is in motion, and the pressure is consequently maintained by the pump 31, while the pump 30 is running idle on account of the uncovered opening between the spaces 42 and 44. However, with a consumption of a larger quantity of pressurized oil in the system, so that the pressure is lowered, the pump 30 is also brought into function, that is to say, the pumps 30 and 31 will then cooperate. On the other hand, when the vehicle is standing still, the pressure in the system is maintained by the fact that the pump 30 is connected by means of a conduit 43 with another space 44 between two piston portions 45 and 46, of which the piston portion 45 opens a communication between the space 44 and the outlet 42 at an inconsiderably lower pressure.

A conduit 47 leads from the space 36 to a space 48 between two piston portions 49 and 50 of a selector slide 51, which serves to shift the control mechanism for various operating conditions. In Fig. 2 the selector slide 51 takes its neutral position, the pressure of the system being then prevented from propagating to the other parts of the control arrangement. If it is desired to start the vehicle, the selector slide is moved to the automatic forward position, i.e. so far to the left in the figure that the right hand edge of the piston portion 49 uncovers a conduit 52 leading from the selector slide, the piston portion 49 being thus caused to take the position indicated by dash lines. Over an annular channel surrounding the piston portion 53a in a so-called throttle valve 53 the conduit 52 communicates with the conduits 54 and 64, of which conduit 54 leads to the servo-motor piston 21. The throttle valve 53 is adapted to be actuated at a depression of the gas pedal, the piston portion 53a thereof provided with a through-passage then effecting a throttling action between the system pressure in the conduit 52 and the space 55a, which will then obtain a reduced pressure, a so-called throttle pressure, the magnitude of which is determined by the spring load over the spring 61. The throttle pressure will then propagate to two conduits 55 and 56 leading from the throttle valve, of which conduits the conduit 55 leads to the lower side of the servo-motor piston 21, which is constructed as a differential piston. Under the influence of the throttle and line pressures in the respective conduits 55 and 54, said differential piston will thus tighten up the brake band 21′ in the change speed gearing according to Fig. 1, which involves that this gearing is adjusted for a low gear speed, so that the vehicle is started.

Extending from the conduit 56 is a branch conduit 57 passing through a space 58 between two piston portions 59 and 60 to a so-called kick-down valve, which is likewise actuated by the gas pedal while being connected to the throttle valve 53 over a spring 61. The branch conduit 57 then opens through branch conduit 57b into a shift valve 62, the mouth of the same being then closed in the position shown by the piston portion 63 of the shift valve. Also leading to said shift valve 62 from the conduits 52 and 55 are branch conduits 64 and 65, respectively, the throttle pressure in the conduit 55 being thus caused to propagate to the space 66 behind a piston portion 67 of the shift valve and tending, together with a spring 68 arranged thereat, to displace the piston slide to the right in the figure. The mouth of a branch conduit 64a extending from the conduit 64 holding the system pressure is, in the position shown, closed by the piston portion 67.

The conduits 56 and 64 are also connected to a second shift valve 69, the conduit 56 being then divided into two branches 56a and 56b, of which conduit 56a opens behind a piston portion 70, so that the pressure in the conduit 56 will tend to displace said piston portion 70 to the right in the figure while compressing a spring 71, which then actuates a second piston slide comprised in the shift valve. A piston portion 72 of this latter piston slide keeps the mouth of the conduit 56b closed in the position shown. Finally, the conduit 64 is connected, over an annular channel surrounding the piston portion 73 in the shift valve 69, to a pressure bell or accumulator 89 holding compressed air and oil of the pressure of the system.

A conduit 74 leads from the pump 31 to a centrifugal governor 75 driven by the vehicle or from the driving axle of the vehicle. It is assumed that the governor 75 rotates about an axis 76, it being then obviously necessary, for a transmission of pressurized medium and for the removal of the same, to make use of special slide devices or the like. The governor proper comprises an outer piston slide 77 having an inner piston slide 78 running therein, which latter carries a weight 79 at its radially outer end. The pressure in the conduit 74 is transmitted to a space 80 between the two piston portions of the slide 77, of which portions the radially inner one has a larger diameter, by reason of which said pressure tends to keep the piston slide 77 in a radially inner position against the effect of the centrifugal force. At a certain rotational speed, the pressure in consideration is incapable of keeping the slide 77 back, said slide then moving outwardly to uncover a conduit 81. Simultaneously therewith, the pressure propagates through a channel 82 to the interior of the piston slide 77, so that the pressure of the conduit 81 will prevail between the two piston portions of the inner piston slide 78. This pressure also keeps the piston slide 78 back, the governor being thus in operation. It should be understood that the pressure of the conduit 81 depends on the rotational speed of the governor, that is to say, on the speed of the vehicle. To begin with, the controlling weight is constituted by all of the three elements 77, 78 and 79, but by degrees the slide 78 will slide outwardly, the weight 79 being thus caused to slide against an abutment 83 rotating with the governor, whereupon the pressure in the conduit 81 will at an increased speed vary according to a curve, the appearance of which is determined by the weight of the piston slide 77.

Inasmuch as shifting of the change speed gearing is principally effected in dependence on the speed of the vehicle and thus in dependence on the pressure of the conduit 81, it is preferable to designate the medium in said conduit as a controlling medium and the pressure in the conduit as a controlling pressure. On the other hand, the pressure of the conduits 55 and 56, as well as of conduits 56a, 56b, 57, 57a and 65 connected thereto, is dependent on the depression of the gas pedal, and the medium in said conduits is understood also to be used for the actuation of the various servo-motors. It is preferable, therefore, to use the expressions throttle pressure and operating medium for the pressure and the medium in consideration. The conduits 52, 54, 64, 64a and the pressure bell 89 are supplied with pressurized medium via the conduit 47, the pressure of said medium being determined by the valve 35; this pressure is called the system pressure or line pressure.

The conduit 81 extends on one side of a piston portion 84 in the shift valve 69 and then continues to one side of a piston portion 85 of the shift valve 62. Now, if according to the above description the servo-motor or the brake band 21' has been thrown into engagement, with the starting of the vehicle in consequence thereto, the centrifugal governor 75 begins to function and permits the transmission of controlling pressure to the piston portions 84 and 85. However, the throttle pressure acts upon the piston portion 70, so that the latter is displaced to the right in the figure in comparison with the position shown, whereby a reduced throttle pressure has been transmitted through a conduit 86 to the space 87 on the side of the piston portion 84 opposed to that on which the controlling pressure is effective. In order that the piston portion 84 shall permit of being displaced to the left in the figure, it is necessary that the controlling pressure is able to counteract the reduced throttle pressure in the space 87 and the pressure of the spring 71.

On the other hand, the controlling pressure effective in the valve 62 on an area smaller than that of the valve 69 finds it relatively difficult to displace the piston portion 85 against the effect of the full throttle pressure in the space 66 and the pressure of the spring 68. The piston slide of the shift valve 62 will thus be displaced only at a higher pressure than will the piston slide of the shift valve 69.

When the piston slide of the valve 69 is displaced to its left hand extreme position shown in the figure, the pressure bell 89 will be connected to the conduit 90 via the reduced portion between the piston portions 72 and 73, while pressurized medium is at the same time supplied over a throttle contrivance 88 to said diagrammatically indicated pressure bell. In this connection, the oil quantity stored in the pressure bell will be supplied via the conduit 90 to the servo-motor 12, so that the corresponding clutch 12' of the change speed gearing will be thrown into engagement thus connecting drive shaft 1 to intermediate shaft 11 and hence effecting an adjustment of the change speed gearing for an intermediate speed, said operation permitting then of being effected relatively rapidly in spite of the fact that the appertaining servo-motor requires a comparatively large quantity of oil.

The oil pressure in the pressure bell 89 falls during the actual throwing of the coupling into engagement, by reason of which this operation may take place in a soft manner. The rise of the pressure up to full line pressure is determined by the throttle 88 and the volume of the bell 89.

Simultaneously with said displacement of the valve 69, throtle pressure is transmitted to the right hand end of the piston portion 72, so that the piston slide will be effectively retained in its new position at the avoidance of so-called hunting.

With a further increased speed and an increased controlling pressure, the piston slide of the shift valve 62 will finally be displaced into its left hand extreme position according to the figure, wherein it is retained by the fact that throttle pressure is supplied over the conduit 57b to the right hand end of the piston portion 63. The piston portion 67 uncovers the conduit 64a, so that the system pressure may actuate the servo-motor 19 over a conduit 91 for the purpose of throwing the clutch 19' into engagement in the arrangement according to Fig. 1. The conduit 91 extends through a space 92 between the piston portions of a stop-valve 93 and reaches the upper side of the servo-motor piston 21, which involves that the spring 94 comprised in the servo-motor in consideration is capable, in combination with the force generated by the pressure difference between the throttle and system pressures, to disengage or to loosen the brake band 21' in the arrangement according to Fig. 1. Hereby the change speed gearing will be adjusted for the highest speed.

If in driving at the highest speed it is desired to pass over to driving at an intermediate speed for a rapid acceleration or the like, one proceeds by depressing the gas pedal entirely, the kick-down valve 59 and 60 being thus displaced to the left in the figure at a simultaneous actuation of the throttle valve 53, so that the throttle pressure will be increased momentarily. By its displacement, the kick-down valve has uncovered an outlet opening 96, controlled by a spring-loaded valve 95, the conduit 57 having then also been shut off by the piston portion 60. The consequence of this is that the pressure in the space 58 will rapidly fall to a relatively low value in spite of a certain supply of pressurized medium through a narrow conduit 57a. By reason of the increased throttle pressure in the space 66 on the left of the piston portion 67 and the reduced pressure on the right of the piston portion 63, the piston slide of the shift valve 62 will be displaced into its extreme right hand position, whereby the change speed gearing will be returned into an intermediate speed position. The piston slide of the shift valve 62 will then retain its new position, until the speed of the vehicle and thus the controlling pressure have increased so much that the latter is capable of counteracting the relatively high throttle pressure. During this period, a high acceleration capacity and a large tractive power are available for the vehicle.

For rearward driving the selector slide 51 is adjusted in such manner that the piston portion 50 thereof opens a communication between the space 48 and a conduit 97 leading to a servo-motor arrangement 14 for the brake band 14' in Fig. 1, which is shown as a braking bar in Fig. 2. Here, the conduit 52 is understood to be cut off from the supply of pressurized medium, all of the other members of the controlling contrivance being consequently inoperative.

If the selector slide 51 is displaced into the extreme position thereof, the left hand position in the figure, its piston portion 49 will bring the space 48 into communication with a conduit 98, to which is connected a space 99 at the right hand end of the stop-valve 93 in the figure. This valve will then be displaced to the left in the figure against the effect of its spring 100, whereby the upper side of the servo-motor piston 21 will be cut off from the supply of pressurized medium, the space 92 in the relay valve being at the same time brought into communication with an outlet 101. This involves that the servo-motor 21 will always be in operation, and consequently the brake band 21' in Fig. 1 is continuously pulled tight. The conduit 98 is also connected to the space 102 between the piston portions 63 and 67 in the shift valve 62, so that pressurized medium will be supplied to the conduit 91 from the conduit 98, the servo-motor 19 being consequently operative, which is also the case with the clutch 19' in Fig. 1. Under these circumstances, the change speed gearing is adjusted for driving at a low speed alone under so-called motor braking. The spaces on the left of the pistons 84 and 85 will be under system pressure, inasmuch as they are connected to the conduit 98. The throttle pressure and the spring pressure act in the same direction via the piston portions 67 and 70, by reason of which no shifting to an intermediate speed and the highest speed can take place.

Fig. 3 illustrates a modified construction of certain details in the arrangement according to Fig. 2. Here, the connection of the conduit 98 to the selector slide 51 has been removed leftwardly to give room for a conduit 103 leading to the space on the left of the piston portion 85 in the shift valve 62. If the selector slide 51 is displaced so far to the left that the conduit 103 is uncovered, whereas the conduit 98 is cut off, the arrangement will permit driving with an automatic transition between the low speed and the intermediate speed, whereas a transition to direct drive cannot take place, inasmuch as the shift valve 62 cannot be displaced. If the selector slide 51 is displaced so far to the right that the piston portion 49 thereof will cut off the conduit 47, the whole working medium system will be relieved of pressure, so that the change speed gearing cannot be thrown into engagement at all. This position is taken by the selector slide at parking of the vehicle, the gearing being then, if desired, provided with a locking means for the locking of the output shaft in the parking position.

Fig. 2 diagrammatically indicates how a conduit 104 provided with a preferably controllable throttle device 104a extends from the control valve 35, said conduit 104 leading to the hydraulic torque converter 3, 4, 5 having an outlet conduit 105 leading therefrom. The throttle device 104a may be automatically controlled in dependence on the operating conditions, in a manner such that the area is increased at an increased ratio between the numbers of revolution of the pump and the turbine, that is to say at a great slip, the arrangement permitting then of being constructed in substantially the same manner as the controlling means for the valve 106 (see hereinbelow). The outlet conduit 105 is controlled by a spring-loaded valve 106, which thus determines the pressure of the medium in the torque converter. The latter may be constructed with blades provided with openings for a boundary layer control in the manner described in our said patent application Serial No. 455,207. The pressurized medium in the torque converter escapes through these openings to an outlet, not shown, a cooler or directly to an oil sump. Fig. 4 shows in greater detail how the arrangement in view may be devised.

From the conduit 81 leading from the centrifugal governor extends a branch conduit 81a, not shown in Fig. 2 but shown in Fig. 4, said branch conduit being connected to the space on one side of a piston slide 107. The throttle pressure is effective on the other side of this piston and is transmitted from the throttle valve via a conduit 108, which is shown in Fig. 4. The piston slide 107 is adapted to actuate the valve 106, for instance by means of a stem 109, the valve 106 being actuated in a direction to open the same at a rising pressure in the conduit 81. This involves that the pressure in the torque converter will fall. On the other hand, an increasing throttle pressure will tend to displace the piston 107 to the right in Fig. 4. The pressure in the conduit 105, and thus in the torque converter, will consequently vary in dependence on the cooperation between the spring of the valve 106 and the throttle and controlling pressures.

It will appear from the foregoing description that in starting, for example, the pressure is high in the torque converter, which brings about favourable transmission conditions owing to a good boundary layer control on account of a powerful flow through the blade openings, while good cooling of the oil is obtained at the same time through said powerful flow. As soon as the vehicle has been brought up to a certain speed, the pressure in the conduit 81 will counteract the throttle pressure, so that the pressure in the torque converter is diminished. Hereby the flow through said openings is decreased. The effect of the arrangement will thus be such that the boundary layer control is most effective at a high ratio of the numbers of revolution, that is to say in connection with a great slip and a large transmitted torque, while at the same time, when the losses and the rise in temperature tend to become the highest, a better cooling will be had through the increased flow for sucking off the boundary layer, which is obviously desirable.

In Fig. 2, 110 designates a conduit connecting the shift valve 69 with the control valve 35, so that the throttle pressure in the conduit 64 will be transmitted to the right hand side of the piston portion 46 in the control valve 35. Hereby the spring 41 in the control valve is counteracted, so that the pressure in the conduits 47 and 52, that is to say the system pressure, and thus the maximum value of the throttle pressure, is reduced. Hereby a reduced power consumption will be had at the oil pumps and relatively soft switching operations at the shifting of the various members.

The invention is not limited to the embodiments above described and shown in the drawings, but may be modified in its details within the scope of the appended claims.

What we claim is:

1. The combination with a change speed transmission for use in engine driven vehicles and interposed between an engine powered driving shaft means and a driven shaft connected to the running gear of the vehicle, said transmission including planetary gearing and a plurality of control elements therefor such as clutches and brake bands for changing the gear transmission ratio between said driving shaft means and said driven shaft; of a hydraulic system for actuating said control elements in a predetermined sequence, said hydraulic system comprising pump means for establishing the fluid operating pressure in said system, a selector valve and slide settable by the operator to any of four positions, namely neutral, reverse, automatic forward and low speed forward, a throttle valve actuated by the fuel controlling feed to the engine, a governor driven by the vehicle for regulating the fluid pressure in accordance with the vehicle speed, shift valve means controlled by said governor, fluid means extending from said pump means to said shift valve means through said governor, a plurality of servo motors operatively connected respectively to said control elements, one of said servo motors having two pressure chambers in opposition and being double acting and another of said servo motors having one chamber and being single acting, a conduit between a first pressure chamber of said double acting servo motor and the pressure chamber of said single acting servo motor, a normally open position fluid pressure actuated stop valve in said conduit, a control chamber for actuating said stop valve to a closed position and said first pressure chamber to a vent outlet, fluid conduit means extending from said pump means through said selector valve to said control chamber of said stop valve, fluid conduit means extending from said pump means through said selector valve to and through said throttle valve to the second pressure chamber of said double acting servo motor and from said throttle valve to and through said shift valve means to said pressure chamber of said single acting servo motor and hence also to said first pressure chamber of said double acting servo motor through said conduit and said normally open stop valve, said selector valve slide when set to automatic forward position effecting through operation of said throttle valve and shift valve means a sequential actuation of said single and double acting servo motors, the first of said servo motors to be actuated being double acting and returned to its initial position by fluid flow to said first pressure chamber thereof through said stop valve from the pressure chamber of said single acting servo motor when the latter is actuated whereby said transmission is stepped from a lower to a higher speed transmission ratio, said selector slide valve when set to low speed forward position and in cooperation with said throttle valve effecting actuation of said stop valve to its closed position to block fluid communication between said first pressure chamber of said double acting servo motor and said pressure chamber of said single acting servo motor and simultaneously connecting said first pressure chamber to said vent outlet and effecting actuation of both said single acting and double acting servo motors by application of fluid pressure to said second pressure chamber of said double acting servo motor and to said pressure chamber of said single acting servo motor.

2. A change speed transmission control as defined in claim 1 wherein said transmission includes a torque converter having pump and turbine elements and provided with means for boundary layer control, and which further includes means operable when said selector valve slide is in the low speed forward and in the reverse positions for decreasing the pressure of the fluid medium in said torque converter simultaneously with a decrease in the slip between said pump and turbine elements, and vice versa.

3. A change speed transmission control as defined in claim 1 wherein said transmission includes a torque converter provided with means for boundary layer control, an outlet and a valve in said outlet and which further includes means operable when said selector valve slide is in the low speed forward and in the reverse positions and responsive to the fluid pressure regulated by said governor for actuating said valve in the outlet of said torque converter in such sense as to reduce the pressure of the fluid medium in said torque converter as the governor regulated fluid pressure of the hydraulic system rises and vice versa.

4. A change speed transmission control as defined in claim 1 wherein said transmission includes a torque converter having pump and turbine elements and provided with means for boundary layer control, and which further includes means operable when said selector valve slide is in the low speed forward and in the reverse positions for decreasing the pressure of the fluid medium in said torque converter simultaneously with a decrease in the slip between said pump and turbine elements, and vice versa, last said means comprising a throttle device in the fluid supply conduit leading to said torque converter, and means for increasing area of the passage through said throttle device simultaneously with an increase in the slip between said pump and turbine elements, and vice versa.

5. A change speed transmission control as defined in claim 1 and wherein said hydraulic system includes at least one pressure bell for receiving the fluid under pressure to soften the speed changes in said transmission, said pressure bell also serving as a reservoir for pressurized fluid for gear change which are particularly exacting with respect to their demand for pressurized fluid.

References Cited in the file of this patent

UNITED STATES PATENTS

| | | |
|---|---|---|
| 2,606,460 | Kelley | Aug. 12, 1952 |
| 2,616,310 | Jandasek | Nov. 4, 1952 |
| 2,640,373 | Jandasek | June 2, 1953 |
| 2,645,137 | Roche | July 14, 1953 |
| 2,667,085 | Ackerman | Jan. 26, 1954 |
| 2,679,768 | Baule | June 1, 1954 |
| 2,694,948 | McFarland | Nov. 23, 1954 |
| 2,694,949 | McFarland | Nov. 23, 1954 |
| 2,697,363 | Sheppard | Dec. 21, 1954 |